United States Patent [19]
Fujishima et al.

[11] 3,949,161
[45] Apr. 6, 1976

[54] VIDEO SIGNAL REPRODUCING SYSTEM

[75] Inventors: Tooru Fujishima; Naoto Nishimura; Kazuyoshi Kuwahara; Shinji Ozaki; Masahiko Fujita, all of Yokohama, Japan

[73] Assignee: Hitachi, Ltd., Japan

[22] Filed: July 19, 1974

[21] Appl. No.: 490,062

[30] Foreign Application Priority Data
July 20, 1973   Japan.............................. 48-81472

[52] U.S. Cl. .............. 178/7.1; 178/DIG. 28; 358/7; 358/54
[51] Int. Cl.² ..................... H04N 5/36; H04N 9/11
[58] Field of Search............... 178/7.1, 7.6, DIG. 28, 178/6.7 A; 358/41, 7, 54

[56] References Cited
UNITED STATES PATENTS

| | | | |
|---|---|---|---|
| 2,294,116 | 8/1942 | Graham | 178/DIG. 28 |
| 3,210,468 | 10/1965 | Trott | 178/7.6 |
| 3,495,036 | 2/1970 | Clayton | 178/7.6 |
| 3,702,896 | 11/1972 | Kurahashi | 358/7 |
| 3,767,852 | 10/1973 | Horowitz | 178/DIG. 28 |
| 3,822,362 | 7/1974 | Weckler | 178/7.1 |
| 3,830,972 | 8/1974 | Siverling | 178/7.1 |

OTHER PUBLICATIONS

Dyck and Weckler, "A New Self—Scanned Photodiode Array," Solid State Technology, July 1971, pp. 37–42.

Primary Examiner—Robert L. Richardson
Attorney, Agent, or Firm—Craig & Antonelli

[57] ABSTRACT

A video signal reproducing system comprising means for driving a web of recording medium such as a tape at a constant speed, a self-scanned linear photoelectronic image device disposed for scanning in a direction perpendicular to the traveling direction of the recording medium, a clock pulse generator for applying clock pulses to this image device, and a light source for illuminating the recording medium, whereby information optically recorded on the recording medium can be scanned in a two-dimensional fashion to reproduce a video signal such as a television signal.

2 Claims, 7 Drawing Figures

VIDEO SIGNAL REPRODUCING SYSTEM

BACKGROUND OF THE INVENTION

1. Field of the Invention

This invention relates to a video signal reproducing system in which information such as video information recorded optically on a web of recording medium such as a tape is scanned and read out to obtain a video signal such as a television signal.

2. Description of the Prior Art

A system for scanning a web of film such as a tape in a two-dimensional fashion and reading out video information recorded on the web of film to obtain an electrical signal or video signal is disclosed in, for example, Peter C. Goldmark "Color EVR", IEEE Spectrum, Vol. 7, No. 9, pp. 22 – 33 (1970). Such a video signal reproducing system comprises a so-called flying spot scanner employing a cathode-ray tube as a light source, and a photoelectronic conversion device such as a photomultiplier. However, it has been difficult to reduce the size and weight of such video signal reproducing system and to maintain a high reliability over a long period of time due to the fact that the flying spot scanner has a large size and both the cathode-ray tube used in the flying spot scanner and the photomultiplier have a short service life.

SUMMARY OF THE INVENTION

It is an object of the present invention to provide a video signal reproducing system which is smaller in size and lighter in weight and has a longer service life than prior art systems of this kind.

Another object of the present invention is to provide a video signal reproducing system provided with a novel illuminating means which operates with a satisfactory light utility factor and does not impart any thermal deformation to a web of film illuminated thereby.

Still another object of the present invention is to provide a video signal reproducing system in which a single light source can be used to illuminate information recorded on a web of film and synchronizing marks on the film simultaneously.

In the present invention which attains the objects above described, a self-scanned linear photoelectronic image device and a fixed light source are employed in lieu of a cathode-ray tube and a photomultiplier so as to carry out scanning in one direction or horizontal scanning of a web of film recorded with information thereby reading out the information, and scanning in a direction perpendicular to the above direction or vertical scanning is carried out with the traveling movement of the film for obtaining an electrical video signal. The fixed light source is arranged so that it directs light of stripe pattern in a direction perpendicular to the traveling direction of the film having the information recorded thereon, and at the same time, it can illuminate synchronizing marks on the film.

DESCRIPTION OF THE PREFERRED EMBODIMENTS

Figure 1:
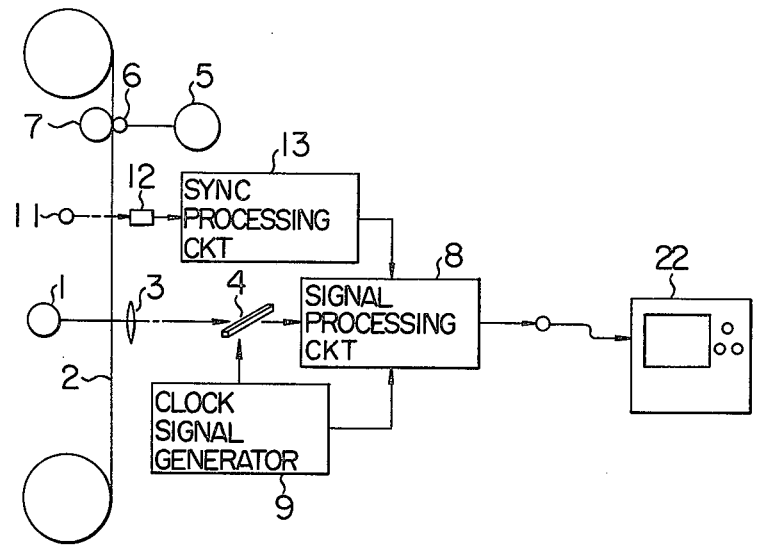
FIG. 1 is a block diagram of an embodiment of the video signal reproducing system according to the present invention.

FIG. 1 is a block diagram of an embodiment of the present invention. Referring to FIG. 1, reference numeral 2 designates a web of film having video information recorded thereon. This film 2 is, for example, an EVR film (Electronic Video Recording film). A light source 1 illuminates this EVR film 2, and the image of the video information recorded on the EVR film 2 is focused by a lens 3 on a self-scanned linear photoelectronic image device 4. This self-scanned linear photoelectronic image device 4 (hereinafter abbreviated as a photoelectronic image device for simplicity) may, for example, be a self-scanned photodiode array such as is disclosed in a paper entitled "A New Self-Scanned Photodiode Array" Solid State Technology, pp. 37 – 42, July 1971, written by R. H. Dyck and G. P. Weckler. A capstan 6 driven by a motor 5 cooperates with a pinch roller 7 for causing traveling movement of the EVR film 2, and vertical scanning is carried out with the movement of the image of the video information recorded on the EVR film 2 over the photoelectronic image device 4. A clock signal generator 9 applies horizontal scanning clock pulses to the photoelectronic image device 4 so that a video signal output appears from the photoelectronic image device 4 to be applied to a signal processing circuit 8 as a result of the horizontal scanning and the vertical scanning. The clock signal generator 9 generates a horizontal synchronizing signal in addition to the clock pulses and this horizontal synchronizing signal is applied to the signal processing circuit 8. This signal processing circuit 8 is a means which processes the signal read out from the EVR film 2 so that such signal can be conveniently displayed on a video monitor. This signal processing circuit 8 may be a circuit similar to that commonly incorporated in prior art video signal reproducing systems employing a flying spot scanner.

A synchronizing signal detecting light source 11 is provided to illuminate synchronizing marks on the EVR film 2. The position of the synchronizing marks is detected by a photoelectric detector 12, and the output of the photoelectric detector 12 is subjected to wave shaping in a synchronizing processing circuit 13 to be applied as a vertical synchronizing signal to the signal processing circuit 8. In the signal processing circuit 8, the horizontal synchronizing signal supplied from the clock signal generator 9 and the vertical synchronizing signal derived from the synchronizing processing circuit 13 are added to the video signal read out by the auto electronic image device 4 to provide a composite television signal. The output signal of the signal processing circuit 8 is applied to a video monitor 22 which may be a television receiver so that the image can be viewed. When the video monitor 22 is a conventional television receiver and is not provided with a base band video signal input terminal, a modulator (not shown) for modulating a carrier wave of high frequency by the output of the signal processing circuit 8 may be provided to obtain an RF signal so that this RF signal may be received by the antenna terminal of the television receiver.

Only one photoelectronic image device 4 is illustrated in the embodiment shown in FIG. 1. However, when the EVR film 2 carries a recording of a color video signal which consists of a brightness signal and a chrominance signal, two such photoelectronic image devices may be arranged in parallel to be driven by the same clock pulses so as to obtain the brightness signal and chrominance signal respectively. In this case, the signal processing circuit 8 may be one commonly employed in prior art color video signal reproducing systems employing a flying spot scanner. The brightness signal and chrominance signal derived from the two photoelectronic image devices are applied to the signal processing circuit 8 in which, for example, the frequency of the chrominance subcarrier is converted so as to be suitable for display of the image on the video monitor 22 thereby obtaining a signal having a form similar to that of a standard television signal.

Figure 2:
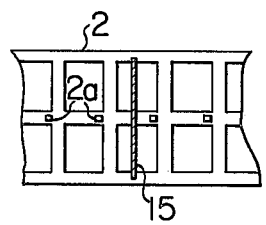
FIG. 2 shows a manner of illuminating a web of film.

FIG. 2 shows a manner of illuminating the EVR film 2 by the light source 1. It will be seen from FIG. 2 that a stripe of light 15 is directed from the light source 1 to illuminate the EVR film 2. In order to illuminate the EVR film 2 with the stripe of light 15 which is perpendicular to the longitudinal direction of the film 2 in the manner shown in FIG. 2, a light barrier having a slit may be disposed between the light source 1 and the EVR film 2. According to this arrangement, extra portions of the light emitted from the light source 1 are not directed to the EVR film 2, and thus, heat emitted from the light source 1 is not also applied to the portions except the portion illuminated with the light. Therefore, undesirable deformation of the EVR film 2 by the heat emitted from the light source 1 can be reliably prevented. Synchronizing marks 2a are provided on the EVR film 2 so as to obtain the vertical synchronizing signal.

Figure 3A:
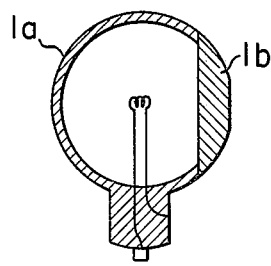
FIGS. 3a and 3b are a sectional side elevation and a sectional plan view respectively of a lamp suitable for directing light in a stripe pattern to the film as shown in FIG. 2.
Figure 3B:
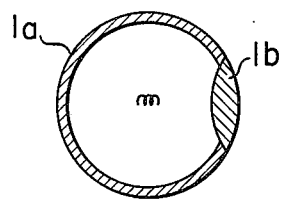

FIGS. 3a and 3b are a sectional side elevation and a sectional plan view respectively of one form of a lamp suitable for illuminating the EVR film 2 in a stripe pattern 15 as shown in FIG. 2. Referring to FIGS. 3a and 3b, a portion 1b acting as a cylindrical lens is formed in a part of the glass bulb 1a of the lamp. The lamp having such a structure can be conveniently used for illuminating the EVR film 2 with a stripe of light as shown in FIG. 2, and the light utility factor can be improved.

Figure 4:
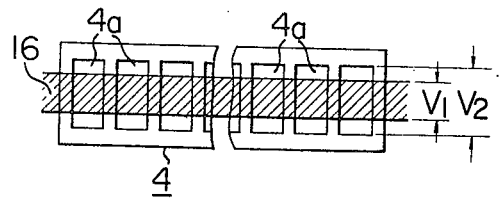
FIG. 4 shows the relation between a self-scanned linear photoelectronic image device and the width of an image formed thereon.

FIG. 4 shows the state in which the image of video information carried by the EVR film 2 illuminated with the light of stripe pattern from the light source 1 is focused on the photoelectronic image device 4 by the lens 3. The image is focused in the form of a stripe 16 and has a width $V_1$ as shown in FIG. 4. The photoelectronic image device 4 comprises an array of unit photosensitive surfaces 4a. The horizontal and vertical resolutions of the image reproduced by the video reproducing system employing such photoelectronic image device are dependent upon the horizontal and vertical widths respectively of the unit photosensitive surfaces 4a forming the photoelectronic image device 4. Each of the unit photosensitive surfaces 4a of this photoelectronic image device 4 is formed by a photodiode, and it is desirable that this photodiode has a large junction capacitance in order to widen the operating range of the photodiode against incident light. The increase in the junction capacitance can be attained by increasing the area of the unit photosensitive surface, but the horizontal width of the unit photosensitive surface (that is, the width in the arrayed direction of these unit photosensitive surfaces) has a certain limitation from the standpoint of desired resolution. Therefore, the width in the vertical direction of the unit photosensitive surface may be increased to increase the area. In such a case, however, the desired vertical resolution would not be obtained when light is incident upon the entire area of the unit photosensitive surface. Thus, it may be necessary to coat a portion of the unit photosensitive surface with a light shielding material so as to narrow the vertical light-receiving width of the unit photosensitive surface. According to the present invention, the light source employed therein is such that the width $V_1$ of the image formed by illumination with light of stripe pattern is narrower than the vertical width $V_2$ of the unit photosensitive surface as seen in FIG. 4. This eliminates the need for applying a light shielding material to the unit photosensitive surface of the photodiode. Therefore, illumination with light of stripe pattern can reduce some of steps required for the manufacture of a photoelectronic image device suitable for use in a reproducing system of this kind.

Figure 5:
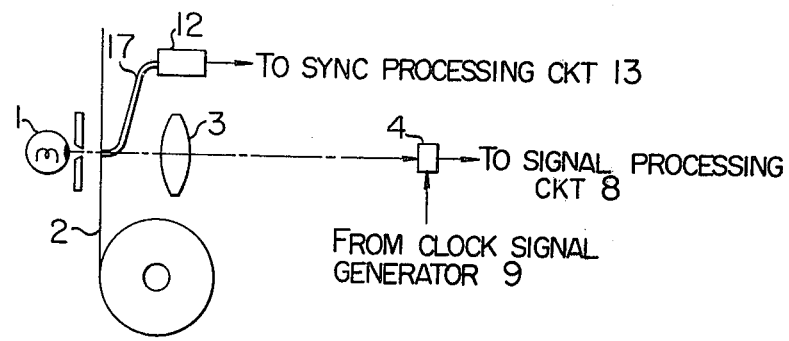
FIG. 5 shows another form of means for detecting synchronizing marks.

FIG. 5 shows parts of another embodiment of the present invention, and like reference numerals are used therein to denote like parts appearing in FIG. 1. FIG. 5 illustrates another form of means for detecting synchronizing marks 2a recorded on an EVR film 2 for deriving a vertical synchronizing signal. In the embodiment shown in FIG. 1, an independent light source 11 has been provided for illuminating the synchronizing marks 2a. Such independent light source 11 is eliminated and a light source 1 used for reading out video information from the EVR film 2 is used also as a means for illuminating the synchronizing marks 2a on the EVR film 2. More precisely, when the light source 1 is adapted for directing a stripe of light 15 to the EVR film 2 as shown in FIG. 2, the synchronizing marks 2a on the EVR film 2 are simultaneously illuminated. The light passed through these synchronizing marks 2a is applied via a light conductor 17 such as an optical fiber to a photoelectric detector 12 so as to detect the synchronizing marks 2a, hence to derive the vertical synchronizing signal.

Figure 6:
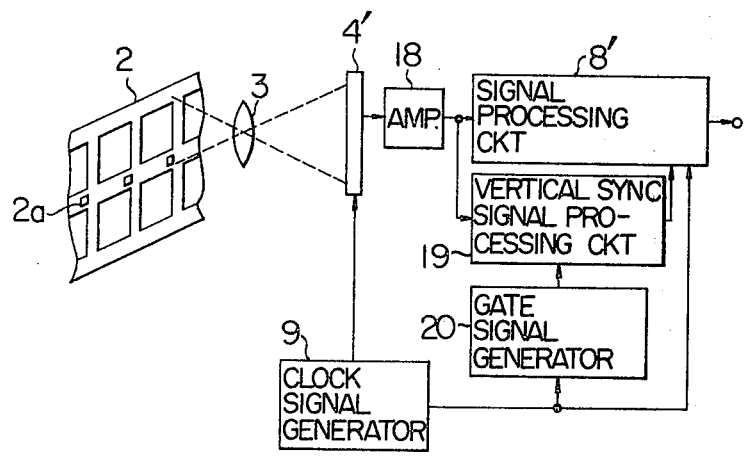
FIG. 6 is a block diagram of parts of another embodiment of the present invention.

FIG. 6 is a block diagram showing parts of still another embodiment of the present invention, and like reference numerals are used to denote like parts appearing in FIG. 1. This embodiment differs from the embodiments shown in FIGS. 1 and 5 in the manner of detecting synchronizing marks 2a on an EVR film 2. A single light source (not shown) is used to illuminate both the image portions and the synchronizing marks 2a on the EVR film 2. In this embodiment, a photoelectric image device 4' is provided for detecting, for example, a brightness signal. This photoelectronic image device 4' is disposed so that it can also detect the synchronizing marks 2a. The detected brightness signal including the signal of the synchronizing marks 2a detected by the photoelectronic image device 4' is applied through a pre-amplifier 18 to a signal processing circuit 8' and to a vertical synchronizing signal processing circuit 19. Further, a horizontal synchronizing signal derived from a clock signal generator 9 is subjected to phase shifting by a gate signal generator 20 so as to obtain a gate signal which is timed exactly with the detected signal of the synchronizing marks 2a appearing in individual horizontal scanning stages as a result of detection of the synchronizing marks 2a. This gate signal is applied to the vertical synchronizing signal processing circuit 19. In the vertical synchronizing signal processing circuit 19, the detected signal of the synchronizing marks 2a is solely picked up from the output signal of the pre-amplifier 18 and is then passed through means such as integrating means and wave shaping means to obtain a vertical synchronizing signal. This vertical synchronizing signal is applied to the signal processing circuit 8'. Other operations are substantially same as those carried out in the embodiment shown in FIG. 1. In the signal processing circuit 8', the brightness signal is combined with the output of another photoelectronic image device (not shown) which detects a chrominance signal, so that a composite color television signal can be obtained.

We claim:

1. A video signal reproducing, wherein said light projecting means comprises illuminating means for directing a narrow stripe of light to said recording medium in a direction perpendicular to the longitudinal direction of said recording medium.

2. A video signal reproducing system for reproducing a television signal from information optically recorded on a web of recording medium, said information including image information recorded in the form of successive frames and synchronizing information recorded in the form of spots which are aligned in a direction of the travel of said web and in positionally synchronizing relationship with said frames, said system comprising:

means for travelling said web of recording medium in its longitudinal direction at a constant speed;

a self-scanned linear photoelectronic image device having a plurality of photosensitive units aligned in a direction perpendicular to the travelling direction of said web and each responsive to a light incident thereto to produce an output signal relating to the intensity of said incident light in accordance with a clock pulse applied thereto;

means for projecting light through a transverse section of said web onto said photoelectronic image device thereby to cause said photoelectronic image device to produce output signals relating to said recorded information in said transverse section, said transverse section extending transversely on said web to cover only the optically recorded information recorded in a predetermined longitudinal distance of said web;

timing signal generating means for generating clock pulses and horizontal synchronizing signals;

means for applying said clock pulses to said photoelectronic image device to drive the same in a horizontal scanning mode;

gate signal means connected to said timing signal generating means for producing gate signals by subjecting said horizontal synchronizing signals to phase-shifting so that said gate signals are shifted from the respective horizontal synchronizing signals by a predetermined phase;

vertical synchronizing signal means connected to said gate signal means and said photoelectronic image device for producing vertical synchronizing signals each upon coincidence between one of said gate signals and one of the output signals of said photoelectronic image device relating to said synchronizing information;

signal processing means connected to said photoelectronic image device, said vertical synchronizing signal means and said timing signal generating means for producing a television signal by compositing the output signals of said image device, the vertical synchronizing signals and the horizontal synchronizing signals.

* * * * *